United States Patent
Schlipf et al.

(10) Patent No.: US 7,735,759 B2
(45) Date of Patent: *Jun. 15, 2010

(54) METHOD FOR THE PRODUCTION OF A FLOWABLE POWDER OF A FLUOROPOLYMER COMPOUND AND FLOWABLE POWDER PRODUCED ACCORDING TO THE METHOD

(75) Inventors: Michael Schlipf, Heidenheim (DE); Martin Metzger, Isny (DE)

(73) Assignee: ElringKlinger AG, Dettingen (DE)

( * ) Notice: Subject to any disclaimer, the term of this patent is extended or adjusted under 35 U.S.C. 154(b) by 53 days.

This patent is subject to a terminal disclaimer.

(21) Appl. No.: 11/811,550

(22) Filed: Jun. 11, 2007

(65) Prior Publication Data

US 2008/0029626 A1 Feb. 7, 2008

(30) Foreign Application Priority Data

Aug. 3, 2006 (DE) .................. 10 2006 036 203

(51) Int. Cl.
*B02C 19/00* (2006.01)
(52) U.S. Cl. .................. 241/3; 241/22; 241/29
(58) Field of Classification Search .......... 241/3, 241/101.4, 73, 24.28, 22, 29
See application file for complete search history.

(56) References Cited

U.S. PATENT DOCUMENTS 4,359,193 A * 11/1982 Schonert .................. 241/3

| 6,013,700 A | 1/2000 | Asano et al. ........... 523/335 |
| 6,037,402 A | 3/2000 | Asano et al. ........... 524/545 |
| 6,523,763 B1 | 2/2003 | Mizoguchi ............... 241/3 |
| 2002/0125602 A1 | 9/2002 | Ishibashi ................ 264/118 |

FOREIGN PATENT DOCUMENTS

| EP | 0 041 687 A1 | 7/1985 |
| EP | 0 931 798 A1 | 7/1999 |
| EP | 120 436 A1 | 8/2001 |
| EP | 1 171 512 B1 | 1/2002 |
| EP | 1 449 866 A1 | 8/2004 |
| WO | WO 98/41567 A1 | 9/1998 |
| WO | WO 98/41568 A1 | 9/1998 |
| WO | WO 98/41569 A1 | 9/1998 |

OTHER PUBLICATIONS

Roy A. Robinson, "Pelleting—The Uses Expand", Nov. 1982, Compressed Air, vol. 87, Nr. 11, ISSN: 0010-4426.
Rumpf H, "Grundlagen und Methoden des Granulierens", 1958, Chenie-Ing.-Techn., vol. 30, Nr.5, ISSN: 0009-286X.

* cited by examiner

*Primary Examiner*—Mark Rosenbaum

(57) ABSTRACT

In order to provide a simple and economical method for the production of a flowable powder of a fluoropolymer compound, there is proposed a method for the production of a flowable powder of a fluoropolymer compound from a dry mixture, which contains at least one fluoropolymer material and at least one filler, including the steps of pressing the dry mixture into lumps and crushing the lumps to form the flowable powder.

26 Claims, 5 Drawing Sheets

METHOD FOR THE PRODUCTION OF A FLOWABLE POWDER OF A FLUOROPOLYMER COMPOUND AND FLOWABLE POWDER PRODUCED ACCORDING TO THE METHOD

The present disclosure relates to the subject that has been disclosed in the German Patent Application No. 10 2006 036 203.9 of 3 Aug. 2006. The entire description of this earlier application is incorporated by reference into the present description.

The present invention relates to a method for the production of a flowable powder of a fluoropolymer compound. The present invention additionally relates to a flowable powder of a fluoropolymer compound produced according to this method.

Fluoropolymer compounds are produced by mixing finely ground powder of a fluoropolymer, which has been produced by the suspension polymerisation process, e.g. PTFE power from S-PTFE, with an average grain size of 5 µm to 100 µm with fillers and converting it into a homogeneous powder mixture using mixers.

The PTFE compounds obtained using this method have a powder density of 100 g/l to 1 600 g/l. These PTFE compounds can only be processed manually, e.g. using a scoop, because of poor flowability. Therefore, automatic processing in particular using automatic filling or apportioning devices is not possible.

The bulk density of such non-flowable compounds varies over a wide range and changes very significantly as a result of external action, e.g. by movement, pressure or vibrating. As a result, uniform filling of the press mould with subsequent homogeneous compaction of the powder during pressing becomes difficult. Non-homogeneous material properties in the end product or internal stresses after sintering can result. Moreover, external actions such as movement or vibrating, for example, in the case of non-flowable compounds can again counteract the originally homogeneous filler dispersion. The thus resulting local accumulations of fillers or of the PTFE powder matrix can result in non-homogeneous properties in the end product. In the extreme case, the filler accumulations lack the bonding action of the PTFE, which can lead to cracks. On the other hand, the abrasion behaviour in the case of tribological stress increases significantly in the regions of the PTFE-powder matrix low in filler.

A method for converting non-flowable PTFE powder or non-flowable modified PTFE powder into PTFE powder with good flowability is known from patent documents WO 98/41567 A1 and WO 98/41568 A1. In this method, working from a non-flowable powder, reactors working stepwise or continuously are used for granulation, in which water and an organic solvent not miscible with water as well as possibly a non-ionic surfactant are intensively stirred.

The application of such a method to PTFE compounds is described in patent document WO 98/41569 A1.

In another method a dry mixture of PTFE powder and filler is mixed with an alcohol, preferably isopropyl alcohol. This mixture is then homogenised to a kneadable mass, which is brought into a rod form by means of a special screen-type mill and applied directly centrally onto a vibration plate. The spiral-shaped contour of the vibration plate conveys the product to the outer edge of the plate, where it is removed. In this case, the vibration movement causes the originally rod-shaped particles to be converted into pellets. After a subsequent drying process, in which the alcohol is removed and the agglomerate consolidated, the product is in a flowable agglomerate form.

In a further known method, working from a powder dry mixture, a mixture of water and a surface-active substance, e.g. a surfactant or glycol, is used to obtain a flowable agglomerate.

However, the aforementioned granulation processes have numerous disadvantages. Thus, in particular the use of solvents can result in the formation of explosive gas/air mixtures. The solvents used can cause health problems for the work force, particularly if these are toxic solvents, e.g. methylene chloride. The flowable product produced by means of these methods can be contaminated by embedded residues of surfactants. Costly drying processes are necessary to remove water, solvent and/or surfactant from the product. Moreover, the known granulation processes are often uneconomical because of the large number of process steps necessary.

It is an object of the present invention to provide a simple and economical method for the production of a flowable powder of a fluoropolymer compound.

This object is achieved according to the invention by a method for the production of a flowable powder of a fluoropolymer compound from a dry mixture, which contains at least one fluoropolymer material and at least one filler, wherein the method comprises the following method steps:

pressing the dry mixture into lumps;
crushing the lumps to form the flowable powder.

In this case, "lumps" should be understood to mean lumpy, band-shaped intermediate products that are generated by pressing the dry mixture.

The method according to the invention is a dry method, i.e. a dry granulation of the fluoropolymer compound without the addition of solvents or water/surfactant mixture.

Therefore, in the method according to the invention, all the disadvantages of the known granulation methods attributable to the use of solvents are removed, in particular the associated emission problems and the problem of a possible contamination of the end product by embedded residues of solvent constituents or additives.

The risk of the compound separating is also largely removed.

The dry granulation method according to the invention is of particularly simple structure and comprises only few process steps, which is why it is particularly economical to implement.

The powder of a fluoropolymer compound obtained according to the method of the invention has a good flowability and can be easily apportioned by automatic devices in machines for further processing.

In principle, all machines that are typically used for the press processing of PTFE compounds are suitable for further processing the powder produced according to the invention, i.e. for example: hydraulic presses, automatic and isostatic presses or ram extrusion.

The powder produced in this way is particularly suitable for processing by means of ram extrusion.

The electrostatic chargeability of the flowable powder can be negligible in comparison to the non-flowable dry mixture, which is why the risk of a contamination of the flowable end product is very small.

The dry mixture contains at least one fluoropolymer material in powder form and at least one filler in powder form.

In a preferred configuration of the method according to the invention, the dry mixture has a filler content of 60% by weight at maximum.

In principle, all organic or inorganic materials that are usable as filler of a fluoropolymer compound come into consideration as fillers.

It is preferably provided that as filler the dry mixture contains an organic filler, in particular PEEK, a polyimide, an aromatic polyester, PPS and/or PPSO2, and/or an inorganic filler, in particular glass powder, glass fibres, bronze, carbon, graphite, $SiO_2$, $Al_2O_3$ and/or $MoS_2$, and/or a mixture of a plurality of organic fillers, a mixture of a plurality of inorganic fillers and/or a mixture of at least one organic filler and at least one inorganic filler.

In addition, it is preferably provided that the dry mixture contains polytetrafluoroethylene (PTFE) or modified polytetrafluoroethylene as fluoropolymer material.

Both types of PTFE are produced by means of suspension polymerisation.

In this case, a "modified polytetrafluoroethylene" is a PTFE-like substance, wherein the molecular structure of the PTFE has been chemically modified as a result of a further, likewise perfluorinated, monomer being incorporated into the molecular chain besides TFE, so that the fluorine atoms of the PTFE are partially replaced by substituents.

The chemical composition and production of "modified PTFE" are described, for example, in patents EP 0 041 687 A1, EP 0 931 798 A1 or U.S. Pat. No. 6,013,700.

The PTFE or modified PTFE used as constituent of the dry mixture is preferably produced as a suspension PTFE or chemically modified suspension PTFE in batch processes in stirred-tank reactors in the presence of water, wherein after polymerisation the aqueous phase is separated in several stages and the raw suspension polymerisate obtained is dried and ground.

The dry mixture used for the method according to the invention preferably has a bulk density of approximately 100 g/l to approximately 1 600 g/l.

The flowable powder produced by means of the method according to the invention preferably has a bulk density of approximately 400 g/l to approximately 2 500 g/l.

It is particularly favourable if the flowable powder has a higher bulk density than the dry mixture that is used as starting material.

The fluoropolymer material in the dry mixture used as starting material preferably has an average grain size $d_{50}$ of approximately 5 µm to approximately 100 µm.

The flowable powder produced by means of the method according to the invention preferably has an average grain size $d_{50}$ of approximately 300 µm to approximately 2 500 µm.

It is particularly favourable if the flowable powder has a higher average grain size $d_{50}$ than the fluoropolymer material in the dry mixture used as starting material.

In principle, it is possible to feed the dry mixture to a pressing device, in which the dry mixture is pressed to form lumps, simply by the action of gravity.

However, in a preferred configuration of the method according to the invention it is provided that the dry mixture is conveyed to such a pressing device by means of a worm device.

If such a pressing device has two opposing rollers, then the worm device for conveying the dry mixture preferably reaches into the wedge-like region between the opposing rollers.

The worm device preferably has a substantially vertical rotational axis.

In addition, the worm device is preferably operated at a speed of approximately 10 rpm to approximately 100 rpm.

The worm device can have a pitch that decreases in the transport direction of the worm device and/or a diameter that decreases in the transport direction of the worm device.

The transport chamber, in which the worm device is arranged, can have a smooth interior wall.

In a preferred configuration of the invention it is provided that the worm device is arranged in a transport chamber, which has at least one groove running in a spiral shape around the transport direction of the worm device to thus assist the feeding action of the worm device.

In the method according to the invention it can be provided that the dry mixture is pre-compacted before pressing, e.g. by means of a worm device conveying the dry mixture to the pressing device.

In addition, it can be provided that the dry mixture is at least partially deaerated before pressing.

In a preferred configuration of the method according to the invention it is provided that the dry mixture is pressed to form the lumps by means of at least one roller, in particular by means of one roller pair.

The roller or rollers is/are preferably operated with a specific contact force of approximately 1 kN/cm to approximately 10 kN/cm.

In addition, the roller or rollers is/are operated at a speed of approximately 5 rpm to approximately 15 rpm.

The rollers can be provided with a smooth rolling surface or also with a profiled rolling surface.

The rollers or at least the roller surfaces can be made of metal, thermoplastic or thermosetting plastic and/or of an elastomer.

The pressing of the dry mixture to form the lumps is preferably conducted so that the relative density of the lumps produced by pressing the dry mixture amounts to approximately 1.3 g/cm³ to approximately 4.0 g/cm³. The lumps produced by pressing the dry mixture are preferably crushed by means of a mill.

A screen-type mill in particular can be used for this.

The mill is preferably operated at a speed of approximately 60 rpm to approximately 400 rpm.

Original claim 28 relates to a flowable powder of a fluoropolymer compound, which is produced by a method according to the invention.

This flowable powder is suitable in particular for the production of PTFE compound semi-finished products by means of ram extrusion.

Preferred semi-finished products are rods, tubes or other extruded products with simple cross-sections.

Original claim 30 is directed towards a polymer workpiece, which is produced from a flowable powder produced using a method according to the invention.

The following advantages can be achieved in particular by the dry granulation method according to the invention:

The bulk density of the dry mixture used as starting material in the range of approximately 100 g/l to approximately 1 600 g/l is increased to the bulk density of the flowable powder in the range of approximately 400 g/l to approximately 2 500 g/l.

At the same time, the powder is stabilised with respect to the bulk density, so that it has a substantially homogeneous bulk density, which allows a uniform filling of the press mould with subsequent homogeneous compaction of the flowable powder during pressing during the course of a further processing operation.

In addition, the mixture of fluoropolymer material and filler is stabilised against separation.

The grain size distribution of the flowable powder with agglomerates with an average grain size in the range of approximately 400 µm to approximately 2 500 µm replaces the grain size distribution of the ground fluoropolymer powder in the dry mixture with an average grain size of $d_{50}$ in the range of approximately 5 µm to approximately 100 µm and of the filler.

The electrostatic chargeability is reduced by the dry granulation method according to the invention, as a result of which the risk of a dirt inclusion and separation during the subsequent processing of the flowable powder is reduced.

The economic efficiency and reproducibility of the subsequent further processing of the powder are improved because the flowable powder produced by the method according to the invention can be further processed automatically.

The increase in the bulk density as a result of the method according to the invention, a consequence of the granulation step, increases the economic efficiency in particular in the case of automatic press processing, and moreover allows the production of products with larger dimensions than is possible in the case of non-flowable powders and using the same press moulds.

Further features and advantages of the invention are the subject of the following description and the representation of exemplary embodiments in the drawings.

Identical or functionally equivalent elements have been given the same reference numerals in all figures.

Figure 1:
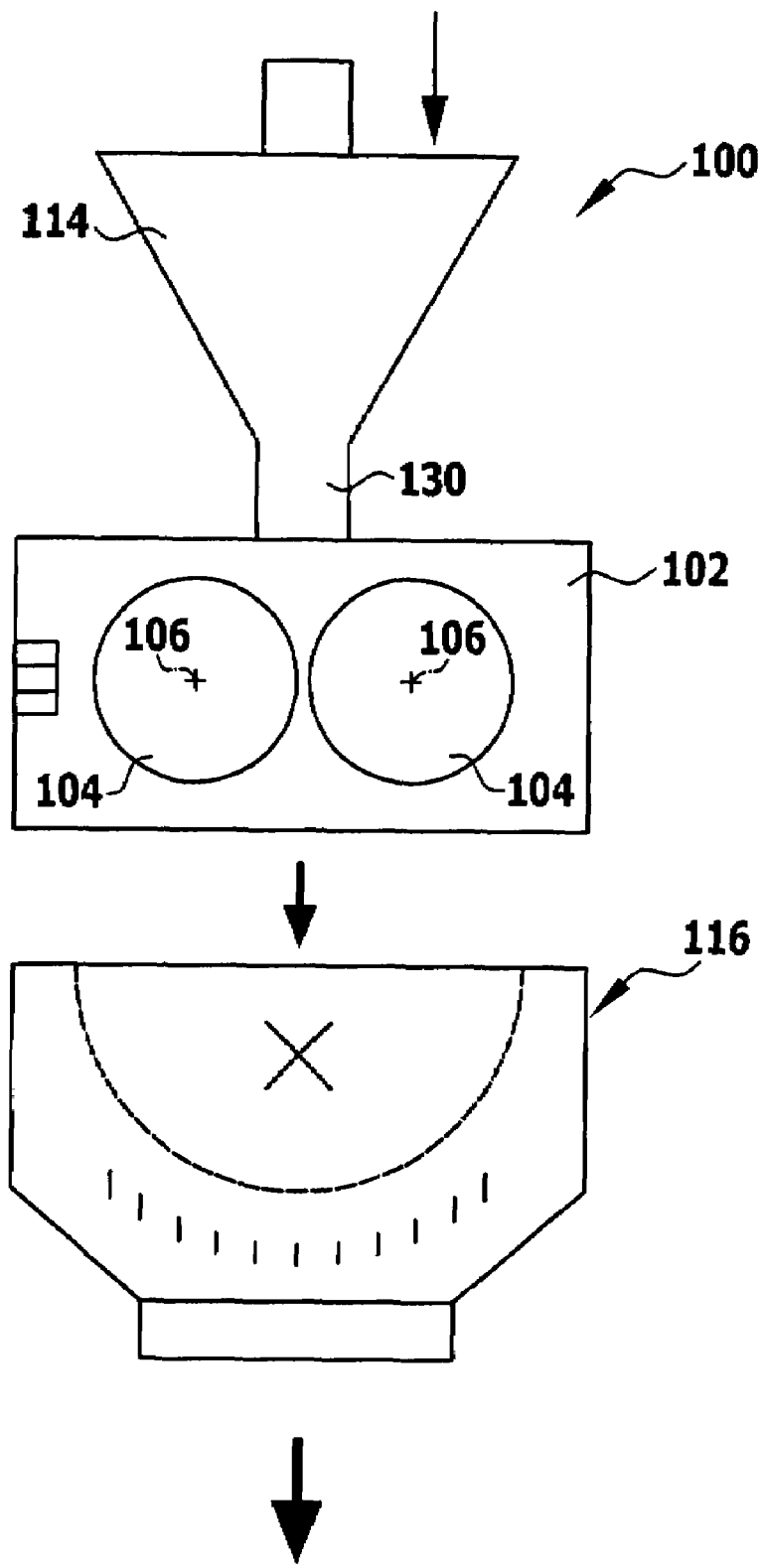
FIG. 1 is a schematic representation of a device for producing a flowable powder of a fluoropolymer compound from a dry mixture.
Figure 2:
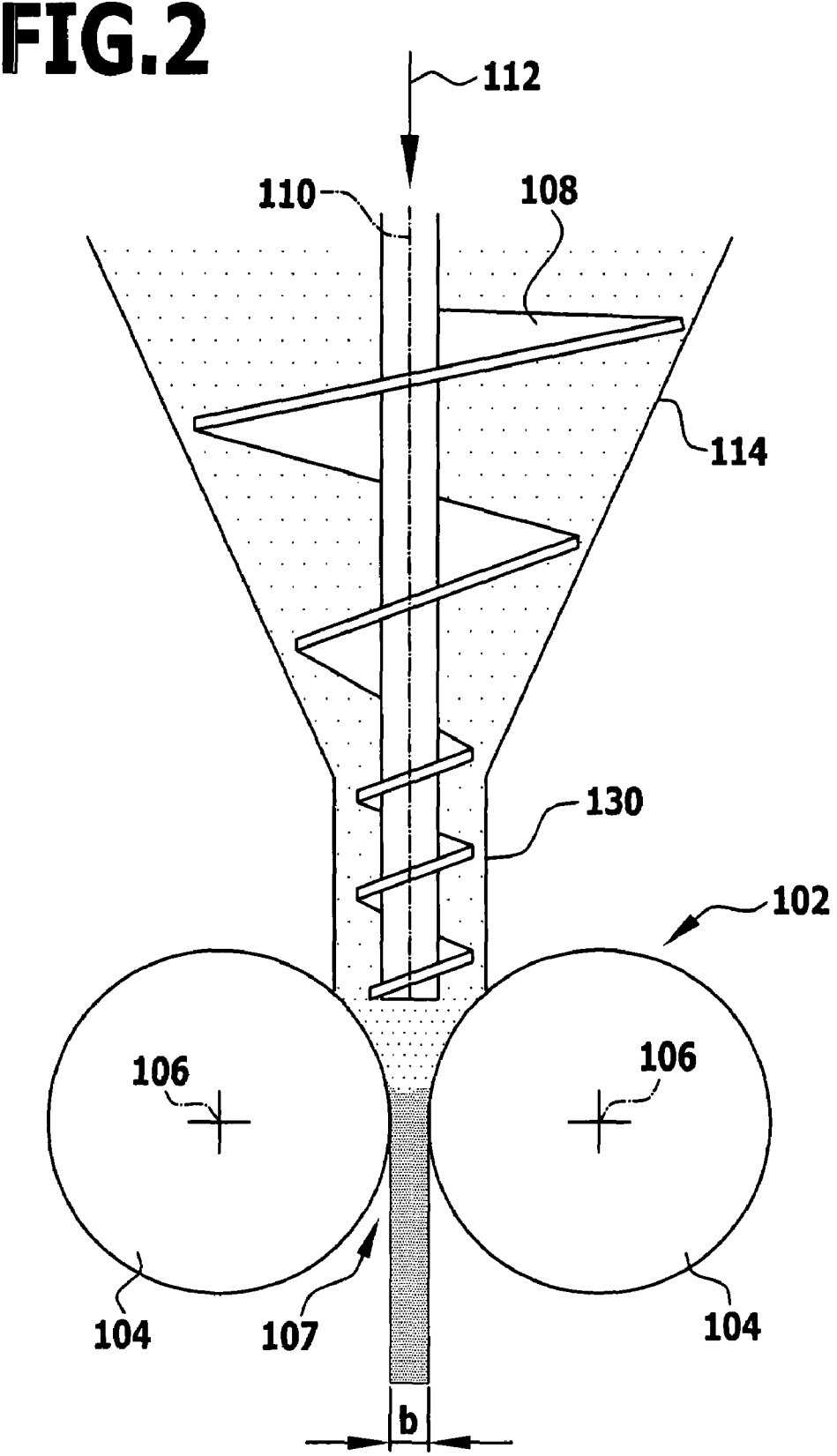
FIG. 2 is a schematic section through a pressing device of the device from FIG. 1, which comprises a pair of rollers, and a worm conveying the dry mixture to the pressing device.

A device, shown in FIGS. 1 to 5 and given the overall reference 100, for producing a flowable powder of a fluoropolymer compound from a dry mixture, which contains at least one fluoropolymer material and at least one filler, comprises a pressing device 102 with a pair of rollers 104, which are mounted to be rotatable around horizontal rotational axes 106 oriented parallel to one another and can be driven to perform a rotational movement around the rotational axes 106.

A roll gap 107 with a gap width b (see FIG. 2) of 1 cm, for example, and a gap length l (extent perpendicular to the plane of the drawing in FIG. 2) of 5 cm, for example, is configured between the rolling surfaces of the opposing rollers 104, so that the cross-sectional area of the roll gap amounts to 5 cm$^2$, for example.

The two rollers 104 rotate in opposite directions at the same roller speed, wherein the direction of rotation of the rollers is directed such that the rolling surfaces of the rollers move downwards at the location of the roll gap 107.

The dry mixture to be pressed to form band-shaped lumps by means of the rollers 104 is fed to the roll gap 107 by means of a worm device 108, the vertical rotational axis 110 of which runs substantially centrally through the roll gap 107.

The worm device 108 has a pitch that decreases in the vertically downwardly directed transport direction 112 and a diameter that decreases in the transport direction 112.

The worm device 108 is arranged in a downwardly tapering storage hopper 114, which merges at its lower end into a cylindrical transport chamber 130, which terminates at the rolling surfaces of the rollers 104.

The storage hopper 114 is closed at the top except for a filling opening.

A wide-mesh grating arranged on the filling opening prevents an unintentional engagement of an operator with the worm device 108.

The dry mixture to be pressed is fed through the upper open end of the storage hopper by means of a scoop and is apportioned to the roll gap 107 by means of the vertically arranged worm device 108.

In this case, the worm shaft extends into the wedge-like between the rolling surfaces of the rollers 104.

Figure 3:
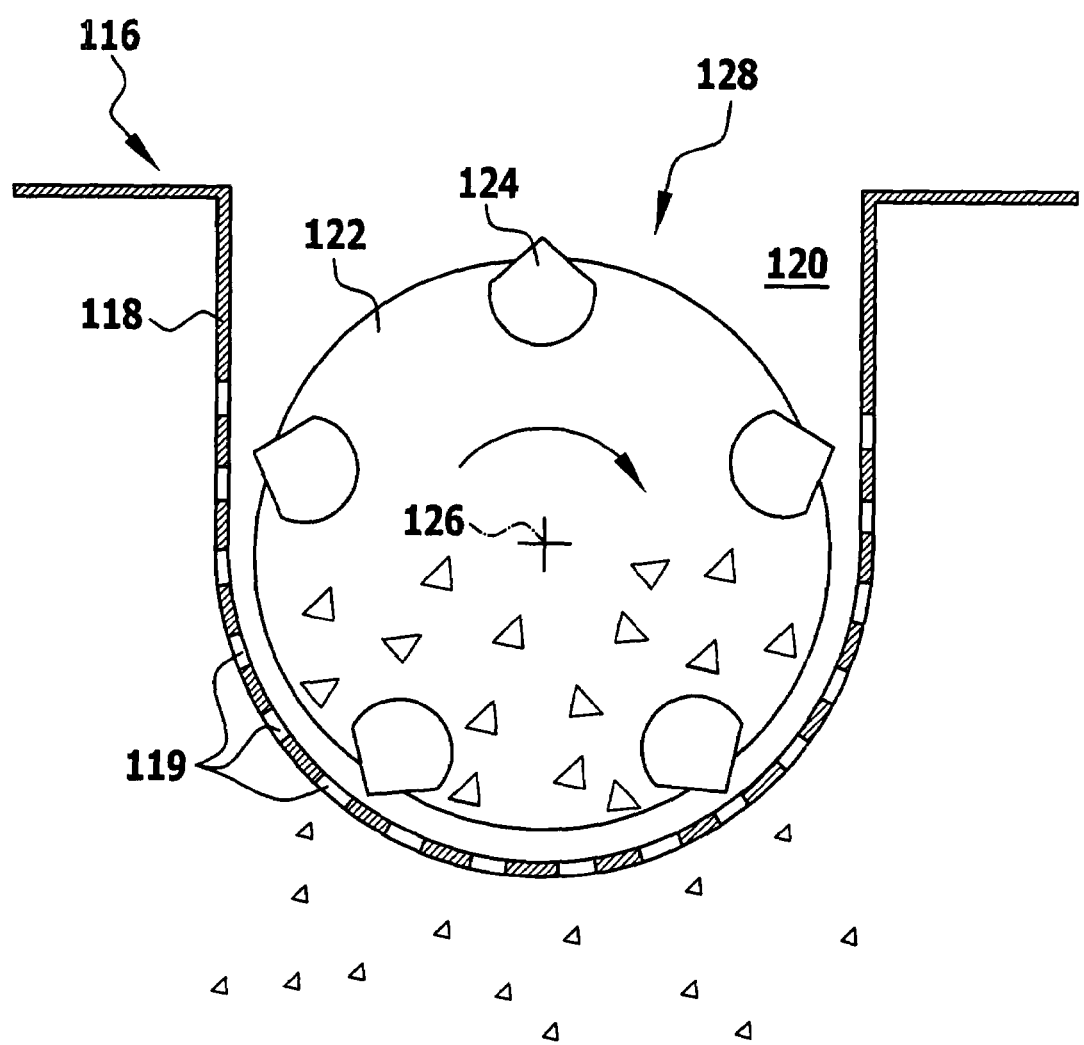
FIG. 3 is a schematic section through a screen-type mill, which crushes lumps produced by means of the pressing device from FIG. 2 to form the flowable powder.
Figure 4:
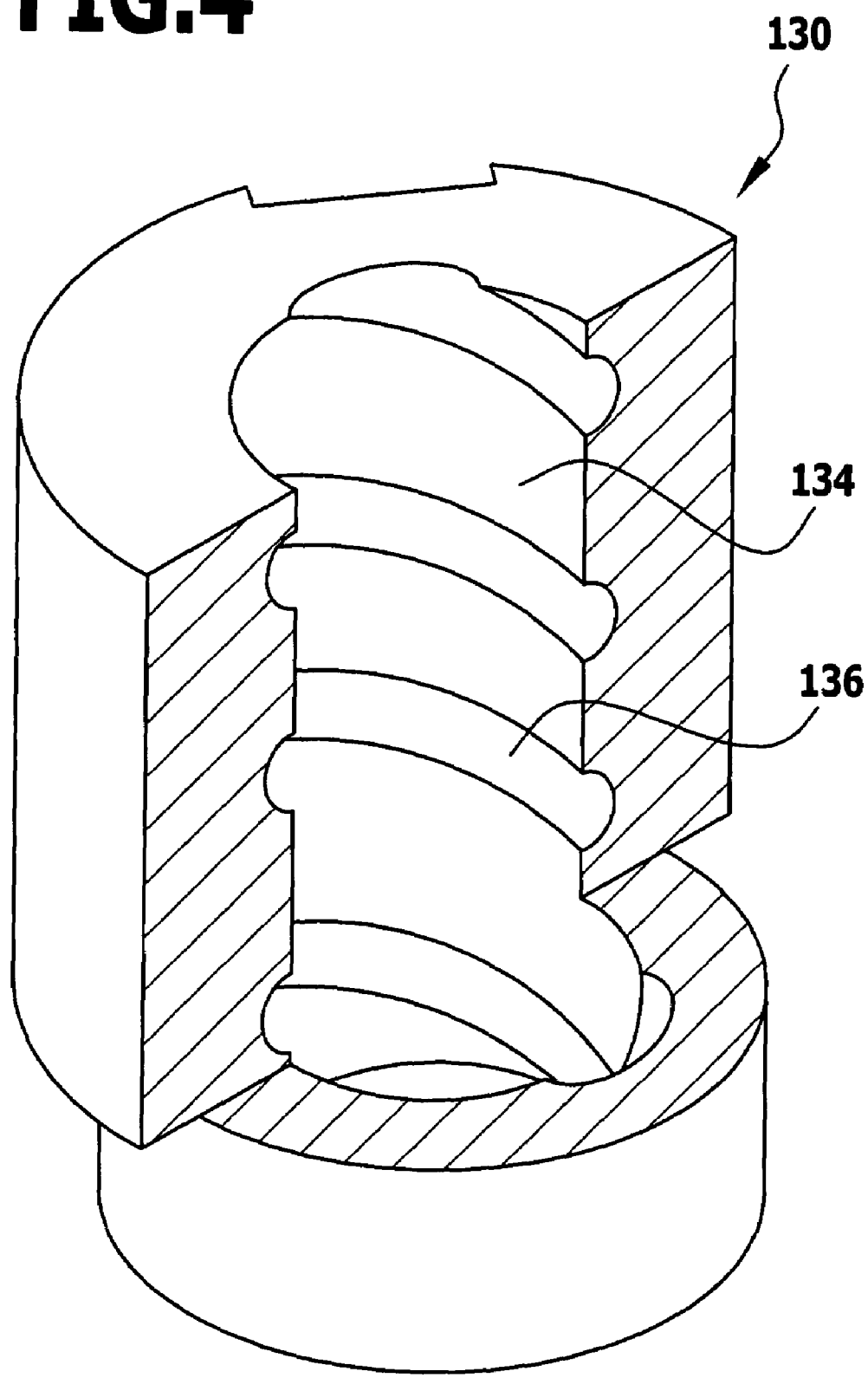
FIG. 4 is a perspective representation in partial section of a cylindrical transport chamber with a spiral-shaped groove for assisting the feeding action of the worm device.

To assist the feeding action of the worm device 108, the cylindrical transport chamber 130 shown in detail in FIGS. 3 and 4 is provided on its inner peripheral wall 134 with a spiral-shaped groove 136, which extends in several turns in the same direction of rotation as the worm device 108 around the longitudinal axis 138 of the transport chamber 130.

Figure 5:
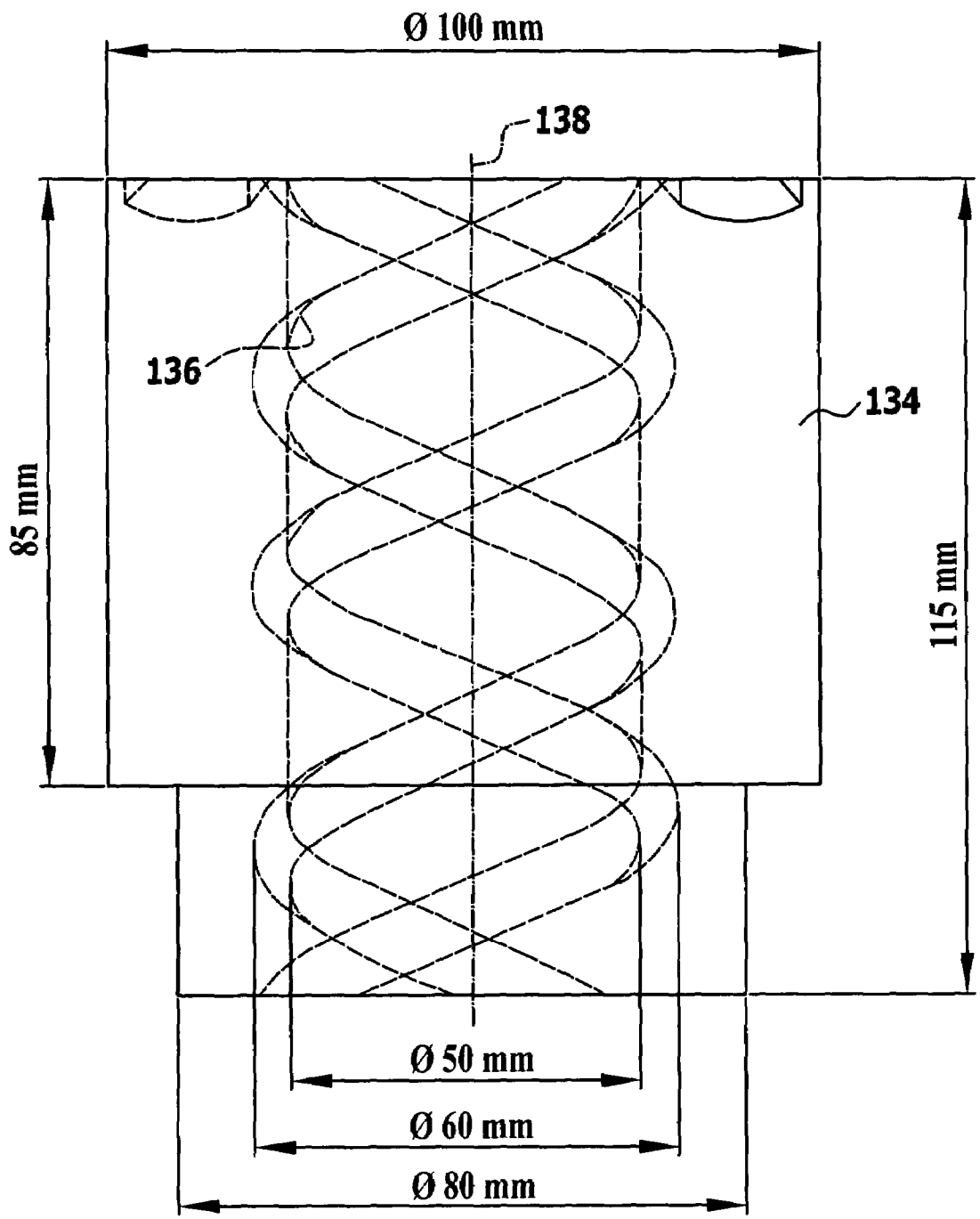
FIG. 5 is a developed view of the peripheral wall of the transport chamber from FIG. 4.

In the developed view of the peripheral wall of the transport chamber 130 shown in FIG. 5, two such grooves 136 with opposing directions of rotation are shown, which can be selectively provided in dependence on the direction of rotation of the worm device 108.

Alternatively to this, a transport chamber with a smooth inner peripheral wall can also be used.

The pre-compacted and partially deaerated dry mixture is pressed by the rollers 104 to form the band-shaped lumps, which then pass into a screen-type mill 116 arranged below the pressing device 102.

The screen-type mill 116 shown in detail in FIG. 3 comprises a curved grinding plate 118, which is provided with holes 119 with diameters in the range of approximately 1 mm to approximately 6 mm.

In the interior 120 of the screen-type mill 116 surrounded by the grinding plate 118 a rotor 122 with five blades 124, for example, rotates around a horizontal rotational axis 126.

The rotor 122 is operated at a speed in the range of approximately 60 rpm to approximately 400 rpm.

The lumps produced by means of the pressing device 102 pass through an inlet 128 into the interior 120 of the screen-type mill 116 and are ground there to a flowable powder by the rotor 122 and the grinding plate 118.

This flowable powder passes through the holes in the grinding plate 118 out of the screen-type mill 116 and is collected in a collection tank (not shown).

From the collection tank the flowable powder is passed on for its further use, e.g. for the ram extrusion of polymer workpieces.

Several examples of a method for the production of a flowable powder of a fluoropolymer compound from a dry mixture conducted by means of the above-described device 100 are described below.

The PHARMAPAKTOR L200/50 P of Hosokawa Bepex GmbH, Daimlerstraße 8, 74211 Leingarten, Germany is used as pressing device 102 in all these examples.

The Pharmapaktor is equipped with smooth rollers with a slight transverse fluting.

The pre-compaction is performed with a cylindrical/conical pre-compactor worm.

Two longitudinal rods are welded into the compactor hopper.

Grooves running in a spiral shape around the direction of passage of the dry mixture can be milled into the inside of the compactor chamber.

The width b of the roll gap 107 amounts to 1 cm in all examples, the length l of the roll gap 107 respectively amounting to 5 cm, so that the cross-sectional area of the roll gap 107 respectively amounts to 5 cm$^2$.

In addition, screen mill FC 200 of Hosokawa Bepex GmbH, Daimlerstraße 8, 74211 Leingarten, Germany is used in these examples as screen-type mill.

EXAMPLE 1

A mixture of 75% by weight of finely ground PTFE powder with an average particle size $d_{50}$ of 25 µm and 25% by weight of glass fibres with an average fibre diameter of 13 µm and an average fibre length $L_{50}$ of 50 µm is used as dry mixture.

The bulk density of the dry mixture used amounts to 536 g/l.

This dry mixture is fed into the storage hopper 114 by means of a scoop and conveyed into the roll gap 107 by means of the worm device 108.

The worm device 108 has the worm parameters 60; 64/100 mm, which means that the pitch of the worm (distance from spiral to spiral) amounts to 60 mm, that the outside diameter of the worm device 108 in its lower cylindrical portion amounts to 64 mm, and that this outside diameter widens to 100 mm in the upper conical portion of the worm device 108.

This worm device 108 is operated at a worm speed of 18 rpm, a worm load current of 1.5 A and with a throughput of 111 kg/hr.

The dry mixture is pressed between the rollers 104 to form band-shaped lumps.

The rollers 104 are operated at a specific contact force of 4 kN/cm, a roller speed of 7.5 rpm and a roller load current of 3.5 A.

One of the rollers used has a concavely curved rolling surface, the other of the used rollers has a smooth-cylindrical rolling surface.

The lumps obtained are ground in the screen-type mill 116 to form a flowable powder with an average grain size of $d_{50}$ of 700 µm and a bulk density of approximately 800 g/l.

The powder obtained has a good flowability and can be easily apportioned by automatic devices for further processing.

EXAMPLE 2

This exemplary embodiment only differs from Example 1 in that the specific contact force of the rollers is lowered to 2-3 kN/cm and the roller speed is increased to 8 rpm.

A powder with good flowability also results with this exemplary embodiment.

EXAMPLE 3

This exemplary embodiment only differs from Example 1 in that the worm speed is increased to 35 rpm, the specific contact force of the rollers is increased to 6 kN/cm and the roller speed is increased to 8 rpm.

A powder with good flowability also results with this exemplary embodiment.

EXAMPLE 4

This exemplary embodiment only differs from Example 1 in that a double-threaded worm device with pitch 40 (i.e. a pitch of 40 mm) is used.

A powder with good flowability also results with this exemplary embodiment.

EXAMPLE 5

This exemplary embodiment only differs from Example 1 in that a worm device with the worm parameters 40/48/90 mm is used, i.e. a worm device with a pitch of 40 mm, its outside diameter amounting to 48 mm in the cylindrical portion and widens up to 90 mm in the conical portion.

A powder with good flowability also results with this exemplary embodiment.

EXAMPLE 6

This exemplary embodiment only differs from Example 1 in that a mixture of 80% by weight of finely ground PTFE powder with an average particle size $d_{50}$ of 25 µm, 15% by weight of glass fibres with an average fibre diameter of 13 µm and an average fibre length $L_{50}$ of 50 µm and 5% by weight of graphite of the type graphite V 1032 is used as dry mixture. This dry mixture has a bulk density of 540 g/l.

The worm device used in this exemplary embodiment has the worm parameters 60/66/120 mm, i.e. a pitch of 60 mm, and an outside diameter, which amounts to 66 mm in the cylindrical portion and widens to 120 mm in the conical portion.

The rollers 104 are operated with a specific contact force of approximately 2 kN/cm and at a roller speed of 7.5 rpm.

A powder with good flowability is also obtained with this exemplary embodiment.

EXAMPLE 7

This exemplary embodiment differs from Example 1 in that a mixture of 80% by weight of finely ground PTFE powder with an average particle size $d_{50}$ of 25 µm, 15% by weight of glass fibres with an average fibre diameter of 13 µm and an average fibre length $L_{50}$ of 50 µm and 5% by weight of graphite of the type graphite V 1032 is used as dry mixture. This dry mixture has a bulk density of 540 g/l.

The worm device used in this exemplary embodiment has the worm parameters 60/66/120 mm, i.e. a pitch of 60 mm, and an outside diameter, which amounts to 66 mm in the cylindrical portion and widens to 120 mm in the conical portion.

The rollers used are provided with a corrugation profile of 6 mm open to the side.

These rollers are operated with a specific contact force of approximately 2 kN/cm.

A powder with good flowability is also obtained with this exemplary embodiment.

EXAMPLE 8

This exemplary embodiment only differs from Example 7 in that the specific contact force of the rollers is increased to 4-5 kN/cm and the roller speed is reduced to 4.5 rpm.

The worm device 108 for conveying the dry mixture into the roll gap 107 is omitted in this exemplary embodiment. Instead, the dry mixture is merely conveyed into the roll gap 107 by the action of gravity in this exemplary embodiment.

A powder with good flowability is also obtained with this exemplary embodiment.

EXAMPLE 9

This exemplary embodiment only differs from Example 8 in that the specific contact force of the rollers is reduced to 2-4 kN/cm and the roller speed is increased to 16 rpm.

A powder with good flowability is also obtained with this exemplary embodiment.

EXAMPLE 10

This exemplary embodiment differs from Example 1 in that a mixture of 75% by weight of finely ground PTFE powder with an average particle size $d_{50}$ of 25 µm and 25% by weight of carbon is used as dry mixture. This dry mixture has a bulk density of 495 g/l.

The worm device used in this exemplary embodiment has a pitch of 60 mm and an outside diameter, which amounts to 64 mm in the cylindrical portion and widens to 100 mm in the conical portion.

The rollers used are operated with a specific contact force of approximately 3 kN/cm and at a roller speed of 6 rpm with a roller load current of 3.5 A.

The worm device is operated at a worm speed of 18 rpm, a worm load current of 1.3 A and with a throughput of 160 kg/hr.

The transport chamber used has a spiral-shaped groove.

A powder with good flowability is also obtained with this exemplary embodiment.

EXAMPLE 11

This exemplary embodiment differs from Example 10 in that a mixture of 90% by weight of finely ground PTFE powder with an average particle size $d_{50}$ of 25 µm and 10% by weight of coal is used as dry mixture. This dry mixture has a bulk density of 450 g/l.

The rollers are operated with a specific contact force of 2 kN/cm, a roller speed of 6 rpm and a roller load current of 3.0 A.

The worm device, which has the same parameters as in Example 10, is operated at a worm speed of 18 rpm, with a worm load current of 1.2 A and a throughput of 140 kg/hr.

A powder with good flowability is also obtained with this exemplary embodiment.

EXAMPLE 12

This exemplary embodiment differs from Example 10 in that a mixture of 40% by weight of finely ground PTFE powder with an average particle size $d_{50}$ of 25 µm and 60% by weight of bronze is used as dry mixture. This dry mixture has a bulk density of 1 200 g/l.

The rollers are operated with a specific contact force of 4 kN/cm, a roller speed of 6 rpm and a roller load current of 4.0 A.

The worm device used has the same parameters as in Example 10 and is operated at a worm speed of 18 rpm, with a worm load current of 1.5 A and a throughput of 190 kg/hr.

A powder with good flowability also results with this exemplary embodiment.

The invention claimed is:

1. Method for the production of a flowable powder of a fluoropolymer compound from a dry mixture, which contains at least one fluoropolymer material and at least one filler, comprising the following method steps:
    conveying the dry mixture to a pressing device comprising at least one roller by means of a worm device;
    pressing the dry mixture into band-shaped lumps by means of the at least one roller of the pressing device;
    crushing the lumps to form the flowable powder by means of a mill.

2. Method according to claim 1, wherein the dry mixture has a filler content of 60% by weight at maximum.

3. Method according to claim 1, wherein the dry mixture contains polytetrafluoroethylene or modified polytetrafluoroethylene as fluoropolymer material.

4. Method according to claim 1, wherein as filler the dry mixture contains an organic filler, an inorganic filler, a mixture of a plurality of organic fillers, a mixture of a plurality of inorganic fillers, and/or a mixture of at least one organic filler and at least one inorganic filler.

5. Method according to claim 4 wherein the organic filler is selected from the group consisting of PEEK, a polyimide, an aromatic polyester, PPS and PPSO2.

6. Method according to claim 4 wherein the inorganic filler is selected from the group consisting of glass powder, glass fibres, bronze, carbon, graphite, $SiC_2$, $Al_2O_3$ and/or $MoS_2$.

7. Method according to claim 1, wherein the dry mixture has a bulk density of approximately 100 g/l to approximately 1 600 g/l.

8. Method according to claim 1, wherein the flowable powder has a bulk density of approximately 400 g/l to approximately 2 500 g/l.

9. Method according to claim 1, wherein the flowable powder has a higher bulk density than the dry mixture.

10. Method according to claim 1, wherein the fluoropolymer material in the dry mixture has an average grain size $d_{50}$ of approximately 5 µm to approximately 100 µm.

11. Method according to claim 1, wherein the flowable powder has an average grain size $d_{50}$ of approximately 300 µm to approximately 2 500 µm.

12. Method according to claim 1, wherein the flowable powder has a higher average grain size $d_{50}$ than the fluoropolymer material in the dry mixture.

13. Method according to claim 1, wherein the pressing device has two opposing rollers and the worm device extends into the wedge-like region between the opposing rollers.

14. Method according to claim 1, wherein the worm device has a substantially vertical rotational axis.

15. Method according to claim 1, wherein the worm device is operated at a speed of approximately 10 rpm to approximately 100 rpm.

16. Method according to claim 1, wherein the worm device has a pitch that decreases in the transport direction of the worm device.

17. Method according to claim 1, wherein the worm device has a diameter that decreases in the transport direction of the worm device.

18. Method according to claim 1, wherein the worm device is arranged in a transport chamber, which has at least one groove running in a spiral shape around the transport direction of the worm device.

19. Method according to claim 1, wherein the dry mixture is pre-compacted before pressing.

20. Method according to claim 1, wherein the dry mixture is at least partially deaerated before pressing.

21. Method according to claim 1, wherein the roller is operated with a specific contact force of approximately 1 kN/cm to approximately 10 kN/cm.

22. Method according to claim 1, wherein the roller is operated at a speed of approximately 5 rpm to approximately 15 rpm.

23. Method according to claim 1, wherein the roller is provided with a profiled rolling surface.

24. Method according to claim 1, wherein the relative density of the lumps produced by pressing the dry mixture amounts to approximately 1.3 $g/cm^3$ to approximately 4.0 $g/cm^3$.

25. Method according to claim 1, wherein the lumps are crushed by means of a screen type mill.

26. Method according to claim 1, wherein the mill is operated at a speed of approximately 60 rpm to approximately 400 rpm.

* * * * *

UNITED STATES PATENT AND TRADEMARK OFFICE
CERTIFICATE OF CORRECTION

PATENT NO. : 7,735,759 B2  
APPLICATION NO. : 11/811550  
DATED : June 15, 2010  
INVENTOR(S) : Schlipf et al.

It is certified that error appears in the above-identified patent and that said Letters Patent is hereby corrected as shown below:

Column 10, Line 30, replace --$SiC_2$-- with --$SiO_2$--.

Column 10, Line 30, replace --and/or-- with --and--.

Column 12, Line 6, replace --screen type-- with --screen-type--.

Signed and Sealed this  
Twenty-second Day of November, 2011

David J. Kappos  
*Director of the United States Patent and Trademark Office*